J. W. WHEELER, Jr.
DIRECTION INDICATOR.
APPLICATION FILED APR. 3, 1922.
1,423,588.
Patented July 25, 1922.
2 SHEETS—SHEET 1.
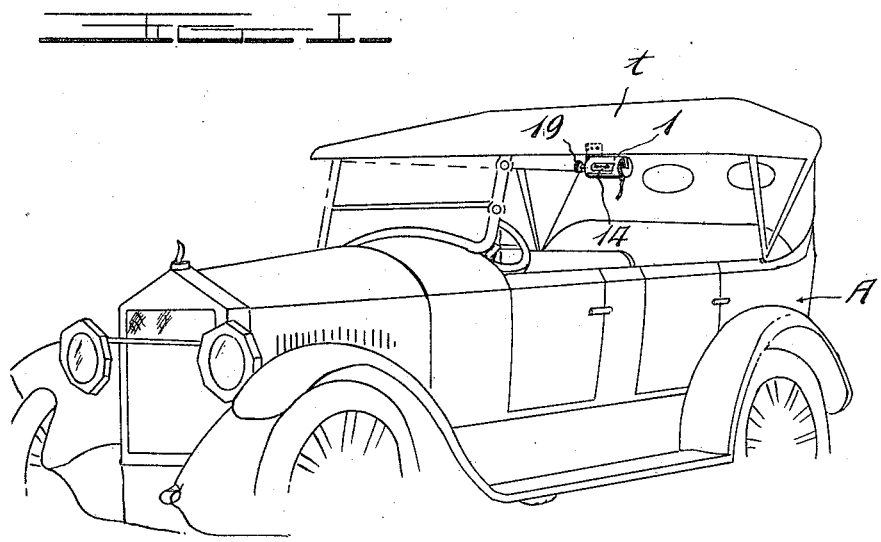
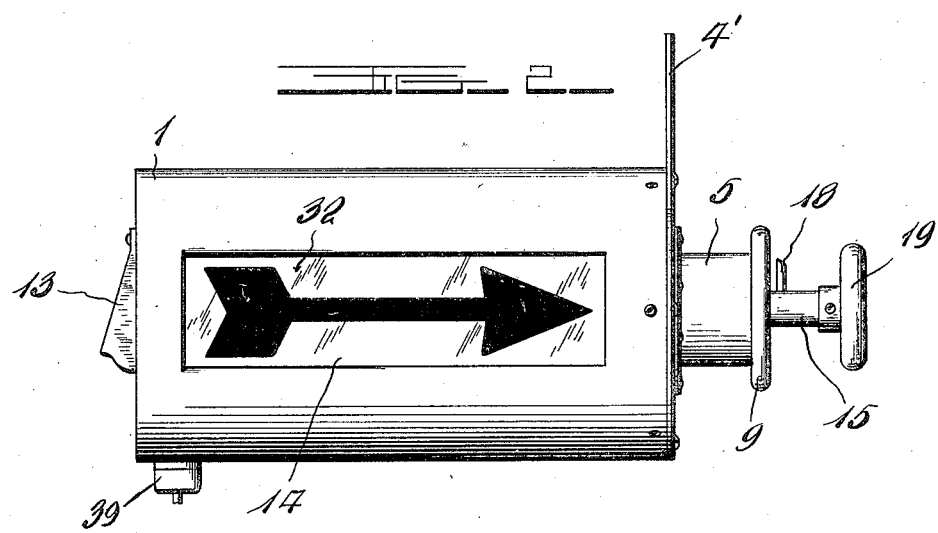
Inventor
J. W. Wheeler Jr.
By William C. Linton
Attorney

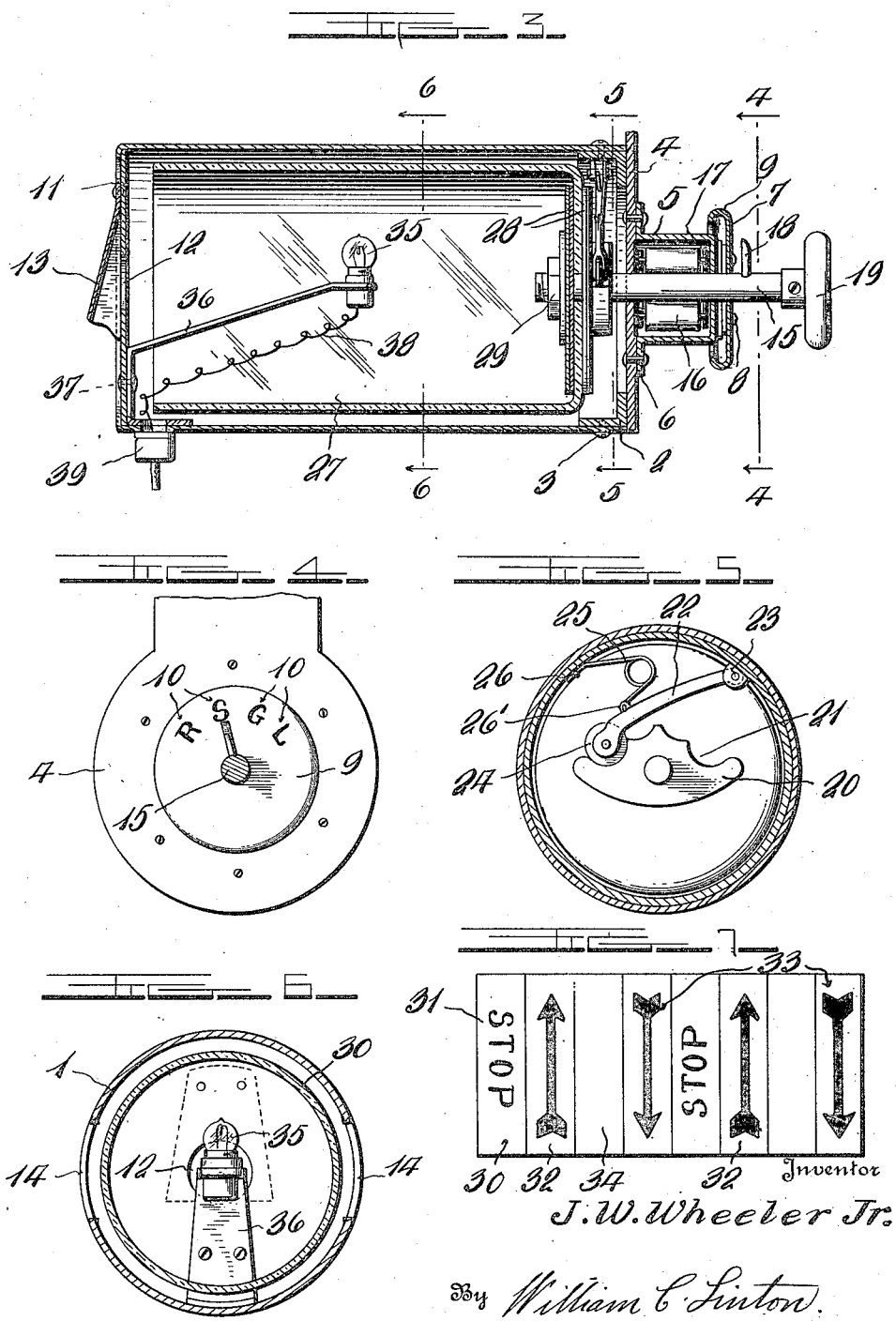

UNITED STATES PATENT OFFICE.

JAMES WALTER WHEELER, JR., OF CHATTANOOGA, TENNESSEE.

DIRECTION INDICATOR.

1,423,588.　　　Specification of Letters Patent.　　Patented July 25, 1922.

Application filed April 3, 1922. Serial No. 549,135.

*To all whom it may concern:*

Be it known that I, JAMES W. WHEELER, Jr., a citizen of the United States of America, residing at Chattanooga, in the county of Hamilton and State of Tennessee, have invented certain new and useful Improvements in Direction Indicators; and I do hereby declare that the following is a full, clear, concise, and exact description of the invention, such as will enable others skilled in the art to which it appertains to make and use the same.

This invention relates to improvements in vehicle signals, having for an object to provide a visual direction indicating signal particularly adaptable for use upon motor driven vehicles, whereby any change in the course of a vehicle so equipped may be clearly signalled to pedestrians and vehicular traffic whereby they will be previously notified of such change in the course of the vehicle and consequently, will be permitted to avoid the same.

It is likewise an object of the invention to provide a direction indicating signal which may be selectively operated by the operator or driver of a vehicle equipped with the same for indicating the path to be traversed without interference with the positive control of the vehicle and in ample time to enable operators of on-coming or following vehicles or pedestrians to govern their movements accordingly.

It is also an object of the invention to provide the indicator with a novel form of means for temporarily but positively securing the selective signal in its displaying position during the signalling period.

Other objects will be in part obvious and in part pointed out hereinafter.

In order that the invention and its mode of operation may be readily understood by persons skilled in the art, I have in the accompanying illustrative drawings and in the detailed following description, set out one possible embodiment of the same.

In these drawings:

Figure 1 is a fragmentary perspective of an automobile equipped with the improved direction indicating signal;

Figure 2 is a side elevation of the improved signal;

Figure 3 is a vertical longitudinal section through the same;

Figure 4 is a vertical transverse section taken on the line 4—4 of Figure 3 looking in the direction in which the arrows point;

Figure 5 is a similar section taken on the line 5—5 of Figure 3 looking in the direction in which the arrows point;

Figure 6 is a corresponding section taken on the line 6—6 of Figure 3 looking in the direction in which the arrows point; and, Figure 7 is a plan view of the signal matter bearing the rotatable drum.

Having more particular reference to the drawings, in connection with which like characters of reference will designate corresponding parts throughout, the improved direction indicating signal may be stated to comprise a hollow cylindrical housing 1 having a circular bracket 2 arranged in one end thereof and secured to adjacent portions of the same through the medium of fastening devices 3 and to which an end plate or closure 4, circular in shape, is secured, said plate 4 having a concentrically located bearing opening therein and carrying upon its outer side a circular secondary housing 5, located concentrically with relation to the bearing opening in the plate 4 and secured to adjacent portions of said plate through the medium of rivets 6 or other suitable fastening devices, such as conditions or preference may dictate. A circular or annular dial 7 is secured, as at 8, to the outer side of the secondary housing 5 and, as shown in the Figure 3, has the marginal portion thereof turned to provide a finishing beading 9; indicia 10 being presented upon the face of said dial 7, preferably consisting of the letters "R," "S," "G," and "L." The end plate 4 may be and preferably is provided with an upwardly extending bracket arm 4' having openings therein whereby to facilitate connection of the indicator housing to the desired portion of an automobile.

In this particular embodiment of the invention, it will be noted that I have shown the housing 1 to be attached through the medium of the bracket arm 4' to one of the bows of the top *t* of the automobile A, said housing extending laterally and outwardly from this particular side of the top *t* and in consequence being readily visible to both following and on-coming pedestrian and vehicle traffic.

The outer end of the cylindrical housing 1 is preferably closed by means of a circular plate 11, which if desired may be formed with a ventilating opening 12 covered by a hood or shield 13, as clearly shown in the Figure 3. Furthermore, windows in form of longitudinally arranged rectangular openings 14 are formed in the opposite sides of the housing 1 and serve as means for permitting the displaying of signalling matter from the device in the manner hereinafter more fully described.

Mounted in the bearings afforded by the end plate 4 and the outer wall of the secondary housing 5 is a longitudinally disposed shaft 15 having the inner end thereof screw-threaded and disposed for engagement with the signalling drum, that portion of said shaft passing through the secondary housing 5 being engaged by cylindrical antifrictional bearings 16 rotatably mounted between and supported by opposed retaining rings 17. Because of the mounting of the shaft 15, it will be understood that the same will be permitted to rotate freely and with the least possible friction; and indicator or pointer 18 being preferably formed in the outer portion of said shaft and adapted to cooperate with the indicia 10 arranged upon the dial 7 whereby rotation of the same to that portion for displaying the desired or selected signal matter may be readily ascertained by an operator. A handle 19 is likewise arranged upon the outer extremity of the shaft 15 and serves for an obvious purpose.

To limit rotary movement of the shaft 15 and to permit of that rotation required for operatively setting the selective signal, a ratchet element in form of an arcuate body 20 is fixedly mounted upon the inner portion of the operating shaft 15 within the housing 1 and has a series of curved seats 21 formed in one marginal portion thereof adapted to receive the free end of a pawl consisting of an arm 22 pivoted at its outer end to the inner side of the housing 1, as at 23 and carrying a roller 24 between the bifurcated free ends thereof, said rollers being adapted to engage in the various seats 21 and when so engaged to temporarily secure the operating shaft 15 in its adjusted position. In order that the arm 22 with the roller 24 will be normally engaged with that marginal portion of the ratchet element 20 having the seats 21 therein, I preferably provide a spring 25, engaging one end of the same with an adjacent portion of the inner side of the ring 2, as at 26, while the opposite end of the same is engaged with the outer portion of the arm 22, at 26′.

As means for signalling, a hollow cylindrical drum 27 is employed, having a wall formed in one end thereof provided with a concentrically located opening adapted to snugly receive the screw-threaded extremity of the operating shaft 15 therethrough, whereby the drum may be securely connected to the latter through the medium of washers 28 engaging the opposite sides of the same and a lock nut 29 turned into engagement with the screw threaded extremity of said shaft. The drum 27, preferably, is formed of glass or similar material whereby it will be either transparent or translucent and has painted or otherwise presented upon its peripheral surface, signalling matter 30 in form of the word "Stop," as indicated at 31, a pair or set of arrows 32 pointing in one direction and another pair or set of arrows 33 pointing in the opposite direction. The arrangement of the word "Stop" is such that the same will be arranged at diametrically opposite points upon the drum 27, while the arrangement of the several pairs of arrows 32 and 33 is similar. Thus, it will be understood that should the set of arrows 32 be arranged to displaying positions by rotation of the drum 27 through the medium of the operating shaft 15, one thereof will be visible through the forward window 14, while the other will be visible through the rearward window 14. Should the other set of arrows 33 be moved to displaying positions, they will be correspondingly rotated with respect to the diametrically disposed windows 14 as will the word "Stop". Blank portions or spaces 34, preferably provided with a coating of green coloring matter are also provided in the signalling matter 30 and are so arranged with relation to each other as to be positioned at diametrically opposite points upon the drum 24 whereby they will be simultaneously displayed from the forward and rearward windows of the housing 1; these colored blanks or spaces being adapted to be normally displayed from the windows 14 of the housing when the vehicle is proceeding upon its usual way.

An electric incandescent lamp 35 is arranged within the drum 27 being received in a suitable socket which in turn is supported upon an inwardly disposed angular bracket arm 36 secured at its outer end as at 37 to the inner side of the outer end wall 11 of the housing 1; electrical conductors 38 extending through a suitable opening formed in the bottom of the housing and an insulating bushing 39 to engagement with the contact terminals of the incandescent lamp 35 and, of course, being supplied with a suitable source of energy, not shown.

To use the improved signal, it is only necessary for an operator of the vehicle to engage the handle 19 and rotate it to that position desired. Should the operator desire to display the word "Stop," he will rotate the shaft 15 until the indicator 18 aligns with the letter "S" upon the dial 7, thus indicating that the drum 27 has been rotated to a position whereat the word "Stop" will be displayed through the forwardly and rearwardly arranged windows 14 in the housing of the device. Similarly, should it be desired to display the set of arrows indicated at 32, the vehicle operator would rotate the drum 27 through the medium of the operating shaft 15 to a point whereat the indicator 18 aligns with the letter "R" upon the dial 7, thus indicating that those arrows signalling that the vehicle would proceed in a direction to the right of its normal course were arranged in displaying positions before the several windows 14 of the housing 1. By reason of the engagement of the roller 24 carried in the spring pressed arm 22 in the seat 21 of the ratchet element 20, it will be understood that as the positioning of the drum 27 is changed through operation of the operating shaft 15, said roller 24 will engage in the adjacent seat 21 and in consequence, temporarily but positively secure the ratchet element together with the operating shaft 15 and the drum 27 in their adjusted positions. Because, however of the inter-positioning of the spring 25 between the arm 22 and the housing 1, the connection of the roller 24 in the seat 21 may be readily terminated by rotating the shaft 15 with the desired force, thus, causing the roller 24 to ride out of engagement with the previously engaged seat 21 and into engagement with the succeeding or following seat, et cetera.

Manifestly, the construction shown is capable of considerable modification and such modification as is within the scope of my claim I consider within the spirit of my invention.

I claim:

A direction indicator comprising a hollow cylindrical housing having end walls, a secondary housing concentrically located with relation to one of said walls, the outer end of said secondary housing and the corresponding end wall of said housing having aligned bearing openings therein, an operating shaft received through said bearing openings, anti-frictional bearing means arranged in said secondary housing engaging portions of said operating shaft, a hollow translucent drum fixedly mounted upon the inner end of said shaft and arranged within the housing having signalling matter presented upon its peripheral surface, said signalling matter being arranged in duplicate and disposed at diametrically opposite points thereon adapted to be simultaneously displayed through diametrically arranged windows in the side walls of the housing, an arcuate element fixedly mounted upon the inner end of said shaft within the housing having a plurality of seats formed in one marginal portion thereof, a spring pressed arm pivoted at one end to the inner side of the housing and carrying a roller in its free end engageable with said seats, a light source supported within the housing and extending into said drum, a dial secured to the outer end of the secondary housing having indicia presented upon its face and an indicator carried upon the adjacent portion of the operating shaft cooperable with said dial.

In witness whereof I have hereunto set my hand.

JAMES WALTER WHEELER, Jr.